US010899495B2

(12) United States Patent
Kim et al.

(10) Patent No.: US 10,899,495 B2
(45) Date of Patent: Jan. 26, 2021

(54) STORAGE UNIT FOR WELDING WIRE

(71) Applicant: KISWEL LTD., Busan (KR)

(72) Inventors: Seong Hun Kim, Changwon-si (KR); A Ra Na, Changwon-si (KR)

(73) Assignee: KISWEL LTD., Busan (KR)

( * ) Notice: Subject to any disclaimer, the term of this patent is extended or adjusted under 35 U.S.C. 154(b) by 6 days.

(21) Appl. No.: 16/288,645

(22) Filed: Feb. 28, 2019

(65) Prior Publication Data

US 2019/0263555 A1 Aug. 29, 2019

(30) Foreign Application Priority Data

Feb. 28, 2018 (KR) .......................... 10-2018-0024311

(51) Int. Cl.
*B65D 5/44* (2006.01)
*B65D 5/12* (2006.01)
*B65D 5/46* (2006.01)
*B65D 5/50* (2006.01)
*B65D 5/60* (2006.01)
(Continued)

(52) U.S. Cl.
CPC .............. *B65D 5/441* (2013.01); *B65D 5/12* (2013.01); *B65D 5/46024* (2013.01); *B65D 5/5028* (2013.01); *B65D 5/60* (2013.01); *B65D 5/64* (2013.01); *B65D 85/04* (2013.01)

(58) Field of Classification Search
CPC . B65D 5/441; B65D 5/60; B65D 5/64; B65D 5/5028; B65D 5/46024; B65D 5/12; B65D 25/22; B65D 25/34; B65D 85/02; B65D 85/04; B65D 81/027

USPC ................ 206/389–416; 229/117.24–117.28, 229/117.09, 117.19; 242/128–129, 137, 242/137.1, 160.2, 170–172, 588.3; 220/755–756, 759, 772; 428/186, 184, 428/182, 108, 212
See application file for complete search history.

(56) References Cited

U.S. PATENT DOCUMENTS 1,184,749 A * 5/1916 Hicks ...................... E04C 2/322
428/186
2,191,291 A * 2/1940 Smith .................... B65D 5/445
229/117.16
(Continued)

FOREIGN PATENT DOCUMENTS

CN 201512727 U * 6/2010
CN 103334348 A * 10/2013
(Continued)

*Primary Examiner* — Chun Hoi Cheung
*Assistant Examiner* — Brijesh V. Patel
(74) *Attorney, Agent, or Firm* — Novick, Kim & Lee, PLLC; Jae Youn Kim

(57) ABSTRACT

Provided is a storage unit for welding wire including an outer case in which an outer bottom supporting part is formed in a lower end thereof and a wire accommodation part configured to store a wound welding wire is formed therein, a bottom part seated on and coupled to the outer bottom supporting part, and an inner case configured to come into close contact with an inner surface of the outer case and having an inner bottom supporting part seated on the bottom part, formed in a lower portion thereof, wherein the outer case includes a strength reinforcement part and a shock absorption part formed at an inner side of the strength reinforcement part to absorb a shock from the outside.

12 Claims, 14 Drawing Sheets

(51) Int. Cl.
*B65D 5/64* (2006.01)
*B65D 85/04* (2006.01)

(56) References Cited

U.S. PATENT DOCUMENTS

| | | | | |
|---|---|---|---|---|
| 2,206,314 | A * | 7/1940 | Werner | B65D 5/46008 229/117.16 |
| 2,794,588 | A * | 6/1957 | George | B65D 5/12 229/125.16 |
| 3,012,660 | A * | 12/1961 | Sheldon, Jr. | B65D 5/12 206/525 |
| 3,096,224 | A * | 7/1963 | Goldstein et al. | B31F 1/2822 428/186 |
| 3,293,107 | A * | 12/1966 | Wells | B31F 1/2813 428/186 |
| 3,932,010 | A * | 1/1976 | Kenworthy | A47B 95/02 16/416 |
| 4,358,498 | A * | 11/1982 | Chavannes | B29C 70/202 428/108 |
| 4,693,413 | A * | 9/1987 | McFarland | B65D 5/4266 229/122.32 |
| 4,729,505 | A * | 3/1988 | Remaks | B65D 5/566 229/109 |
| 4,742,951 | A * | 5/1988 | Kelly | B65D 77/06 229/109 |
| 4,850,506 | A * | 7/1989 | Heaps, Jr. | B65D 77/061 229/117.3 |
| 5,037,027 | A * | 8/1991 | Nichols | B65D 5/0055 206/512 |
| 5,057,176 | A * | 10/1991 | Bainbridge | B31F 1/0009 156/222 |
| 5,193,701 | A * | 3/1993 | Bush | B42F 15/007 206/425 |
| 5,285,957 | A * | 2/1994 | Halsell | B32B 29/02 229/199 |
| 5,295,632 | A * | 3/1994 | Zink | B65D 5/0055 229/117.16 |
| 5,433,156 | A * | 7/1995 | Hutchison | B65D 19/0012 108/51.3 |
| 5,462,221 | A * | 10/1995 | Zink | B65D 5/0055 229/117.16 |
| 5,520,477 | A * | 5/1996 | Fink | B65D 11/18 206/509 |
| 5,522,539 | A * | 6/1996 | Bazany | B65D 5/5088 206/523 |
| 5,568,774 | A * | 10/1996 | Hutchison | B65D 19/0012 108/51.3 |
| 5,894,046 | A * | 4/1999 | Kim | B31F 1/28 428/182 |
| 5,921,391 | A * | 7/1999 | Ortiz | B65H 75/16 206/397 |
| 6,343,696 | B1 * | 2/2002 | McCormick | B65D 81/1275 206/521 |
| D469,012 | S * | 1/2003 | Lee | B65D 19/20 D9/434 |
| 6,619,540 | B1 * | 9/2003 | Bazany | B65D 5/0055 220/642 |
| 6,808,105 | B2 * | 10/2004 | Lee | B65D 5/4608 229/117.09 |
| 6,827,217 | B2 * | 12/2004 | Matsuguchi | B65D 85/04 206/395 |
| 7,331,506 | B2 * | 2/2008 | Lai | B65D 5/445 220/770 |
| 7,552,826 | B2 * | 6/2009 | Watanabe | B65D 19/02 206/600 |
| 8,056,798 | B2 * | 11/2011 | Clohessy | B65D 19/20 206/600 |
| 8,091,768 | B2 * | 1/2012 | Wisecarver | B65D 5/029 229/109 |
| 8,365,912 | B2 * | 2/2013 | Carroscia | B65D 85/04 206/389 |
| 8,652,613 | B2 * | 2/2014 | Lai | B32B 7/12 428/184 |
| 8,967,690 | B2 * | 3/2015 | Cooper | B65D 19/38 280/808 |
| 8,978,964 | B1 * | 3/2015 | Ruggiere, Sr. | B65D 5/445 229/164.1 |
| 9,663,267 | B2 * | 5/2017 | Love | B31F 1/28 428/182 |
| 9,796,153 | B1 * | 10/2017 | Tsodokov | H02S 20/26 |
| 2003/0019776 | A1 | 1/2003 | Matsuguchi et al. | |
| 2004/0007612 | A1 * | 1/2004 | Johanson | B65D 5/4604 229/117.24 |
| 2014/0215765 | A1 | 8/2014 | Cooper et al. | |
| 2015/0321440 | A1 * | 11/2015 | Haessig | B31F 1/2836 428/186 |

FOREIGN PATENT DOCUMENTS

| | | |
|---|---|---|
| CN | 204914778 U * | 12/2015 |
| CN | 205522727 U * | 8/2016 |
| JP | 3013182 U | 7/1995 |
| JP | 2001-301886 A | 10/2001 |
| JP | 2003-072872 A | 3/2003 |
| JP | 2005-29219 A | 2/2005 |

* cited by examiner

STORAGE UNIT FOR WELDING WIRE

CROSS-REFERENCE TO RELATED APPLICATION

This application claims priority to and the benefit of Korean Patent Application No. 2018-0024311, filed on Feb. 28, 2018, the disclosure of which is incorporated herein by reference in its entirety.

BACKGROUND

1. Field of the Invention

The present disclosure relates to a storage unit for welding wire, and more specifically, to a storage unit for welding wire which is easily recycled and durable against an external impact and a buckling load, and includes a strap guide and thus is easily carried.

2. Discussion of Related Art

In a conventional general high capacity storage unit for welding wire, a welding wire is stored in a coil shape in a case body, an inner surface of a case body is covered by a resin, and a metallic cover is covered on an opening of an upper end of the case body, and a boundary between the case body and the cover is sealed with a sealing member such as rubber or the like. Further, in the case body of the storage unit, a lower end portion and an upper end portion which require strength are reinforced by a ring-shaped metal member.

Meanwhile, the storage unit can be repeatedly used to store the welding wire after use, but generally is discarded after being used a predetermined number of times. Before the storage unit is discarded, the ring-shaped metal member and the cover which are made of metal have to be separated from the case body. Otherwise, the ring-shaped metal member and the cover are not separated and all of the above are processed as industrial waste. Accordingly, a conventional storage unit has a complicated recycling process and is not eco-friendly.

Accordingly, recently, an effort to remove a reinforcement member such as metal, plastic, or the like for strength reinforcement and manufacture the whole storage unit with a paper material is continuing.

However, the storage unit made of paper is weak against an external impact in comparison with the conventional storage unit. Further, when storage units are stacked in two layers in a state in which welding wires are stored, a buckling load applied to a lower storage unit from an upper storage unit should be overcome.

In addition, an opening can be formed in a side portion of the storage unit to allow the storage unit to be easily moved, and in the case of the storage unit made of paper, the opening of the storage unit is easily worn and damaged when a process such as lifting or moving the storage unit using a strap is repeated over and over. In order to prevent the above, although there is a method of attaching a fiber reinforcement tape or the like to the opening, the method should be performed by hand and a large amount of time is consumed.

(Patent Document 1) Japanese Laid-Open Patent No. 2001-301886 (Oct. 31, 2001)

SUMMARY OF THE INVENTION

The present disclosure is directed to providing a storage unit for welding wire which is easily recycled and durable against an external impact and a buckling load, and includes a strap guide and thus is easily carried.

According to an aspect of the present disclosure, there is provided a storage unit for welding wire including: an outer case in which an outer bottom supporting part is formed in a lower end thereof and a wire accommodation part configured to accommodate a wound welding wire is formed therein; a bottom part seated on and coupled to the outer bottom supporting part; and an inner case configured to come into close contact with an inner surface of the outer case and having an inner bottom supporting part seated on the bottom part, formed in a lower portion thereof, wherein the outer case includes a strength reinforcement part and a shock absorption part formed at an inner side of the strength reinforcement part to absorb a shock from the outside.

According to an embodiment, the strength reinforcement part may include a first cardboard and a first corrugated cardboard, the shock absorption part may include a second cardboard and a second corrugated cardboard, and the number of corrugations of the first corrugated cardboard may be greater than the number of corrugations of the second corrugated cardboard.

According to an embodiment, $R1=l1/d1$ may be in a range from 2 to 4 when a length between the corrugation of the first corrugated cardboard and a first corrugation of a next wave adjacent to the corrugation of the first corrugated cardboard is $l1$ and a thickness of the strength reinforcement part is $d1$, and $R2=l2/d2$ may be in a range from 2 to 4 when a length between the corrugation of the second corrugated cardboard and a next corrugation adjacent to the corrugation of the second corrugated cardboard is $l2$ and a thickness of the shock absorption part is $d2$.

According to an embodiment, $RC=C1/C2$ may be in a range from 1.27 to 1.67 when the number of corrugations per unit length of the first corrugated cardboard is $C1$ and the number of corrugations per unit length of the second corrugated cardboard is $C2$.

According to an embodiment, the outer case may further include two or more accommodation space parts each configured to accommodate a strap guide in a side portion.

According to an embodiment, the strap guide may be coupled to the accommodation space part, and the strap guide may include: a first module including a first base, a strap boss formed on the first base and including a first slot through which a strap passes, and at least one protrusion accommodation part located at an outer circumferential portion of the strap boss and including a bore; and a second module including a second base, a second slot formed in the second base, and at least one coupling protrusion located at an outer circumferential portion of the second slot and formed to form a pair with the protrusion accommodation part, wherein the first module and the second module are coupled to form an opening having a single closed surface.

According to an embodiment, an edge of the opening may have a gentle round shape.

According to an embodiment, the second base may further include a bent portion having an inclination angle and inclined toward the outside.

According to an embodiment, the accommodation space part may include a center space part into which the strap boss is fitted, and an upper space part and a lower space part into which the protrusion accommodation part is fitted, and the strap guide may be fitted into the accommodation space part According to an embodiment, the first module may be disposed in an interspace part between the outer case and the inner case and the second module may pass through the accommodation space part formed in an outer surface of the outer case from the outer side of the outer case to be coupled to the first module.

According to an embodiment, a height of the strap boss may be greater than or equal to a thickness of the outer case According to an embodiment, the storage unit may further include a strap having a center portion disposed between the outer bottom supporting part and the bottom part and both end portions disposed in the interspace part between the outer case and the inner case, and exposed to an accommodation space part formed to face an outer surface of the outer case to form engaging portions.

According to an embodiment, the inner case may further include at least one cut portion.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
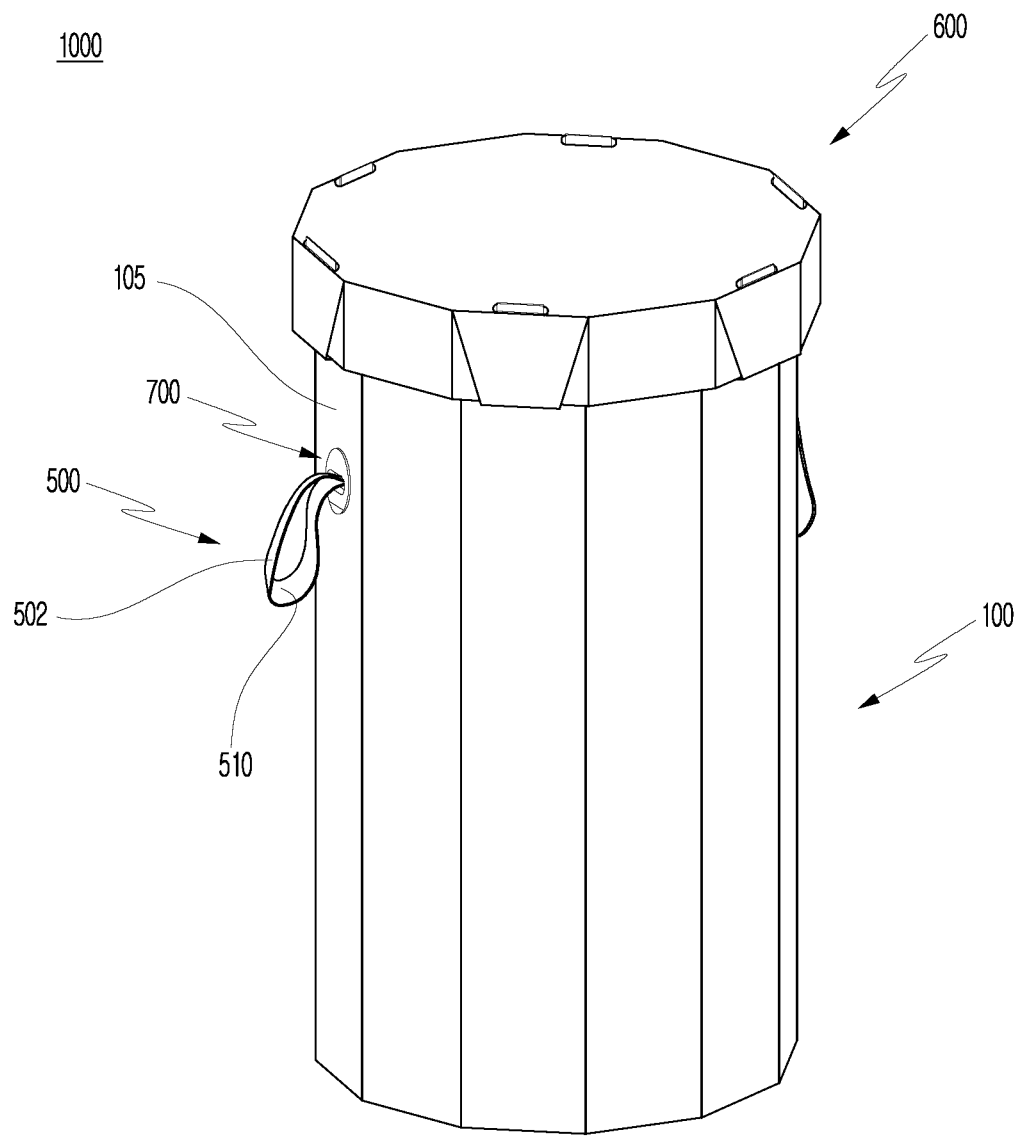
FIG. 1 is a perspective view illustrating an appearance of a storage unit for welding wire according to an embodiment of the present disclosure.

Hereinafter, the present disclosure will be described in detail with reference to the accompanying drawings. However, the present disclosure may be implemented in various forms, and accordingly, the present disclosure is not limited to the following embodiment. Components not related to the description are omitted in the drawings to clearly describe the present disclosure, and the same reference symbols are used for the same or similar components in the description. In the description, in the case in which predetermined components are described as being "connected" to other components, the above case includes a case in which components are indirectly connected to other components. Further, in the case in which predetermined components are described as "including" predetermined elements, the above case does not exclude other elements but may further include the other elements unless otherwise defined.

Hereinafter, the embodiment of the present disclosure will be described in detail with reference to the accompanying drawings.

FIG. 1 is a perspective view illustrating an appearance of a storage unit 1000 for welding wire according to an embodiment of the present disclosure. Further, the storage unit 1000 for welding wire of the present disclosure may be formed of paper.

Referring to FIG. 1, the appearance of the storage unit 1000 for welding wire may be formed by an outer case 100 and a cap 600. The outer case 100 may have a polygonal pillar shape and may preferably have a cross-section having a regular dodecagon shape. An upper portion of the outer case 100 is formed to be open to the outside. The cap 600 may have a polygonal pillar shape corresponding to the shape of the outer case 100 having an inner space portion. The cap 600 serves to close the upper portion of the outer case 100 to protect the inside of the outer case 100. When the cap 600 closes the upper portion of the outer case 100, a part of the upper portion of the outer case 100 may be accommodated in the inner space portion of the cap 600.

Figure 2:
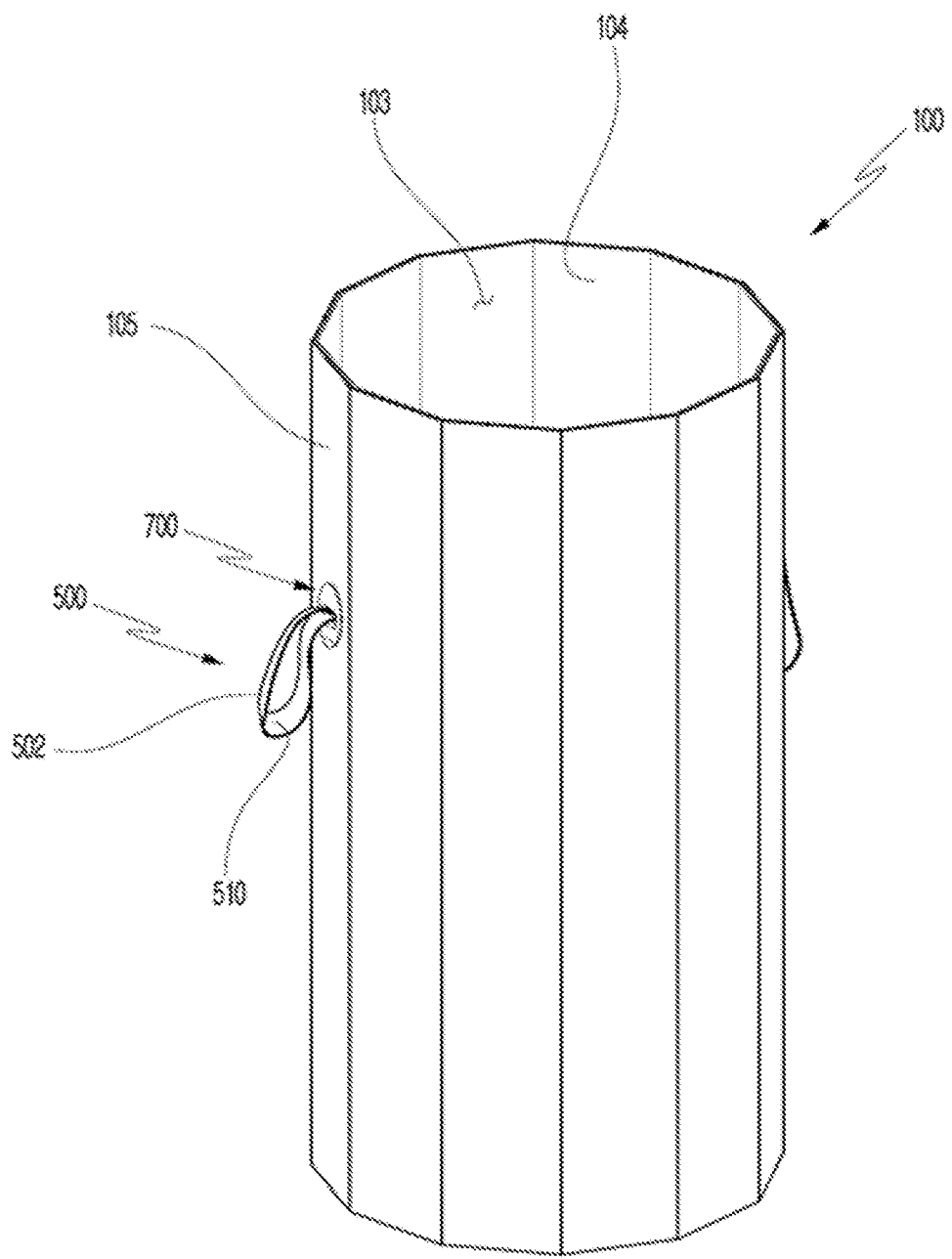
FIG. 2 is a perspective view illustrating an outer case according to the embodiment of the present disclosure.
Figure 3:
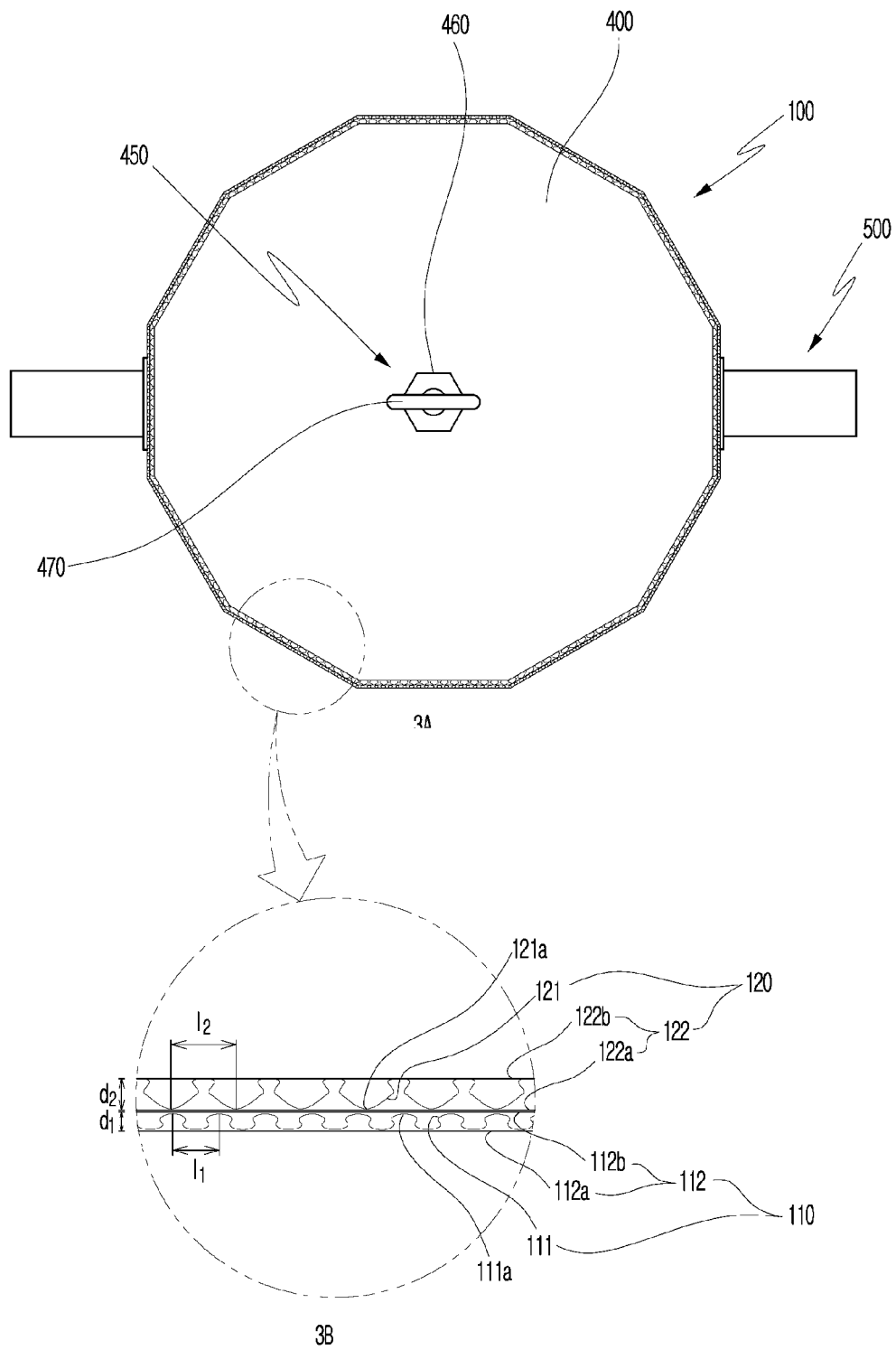
FIG. 3 is a plan view in which the outer case of the present disclosure is viewed from the above, including a partial enlarged view illustrating a strength reinforcement part and a shock absorption part of the outer case, respectively.

FIG. 2 is a perspective view illustrating the outer case 100 according to the embodiment of the present disclosure, FIG. 3 is a plan view in which the outer case of the present disclosure is viewed from the above with a partial enlarged view illustrating a strength reinforcement part and a shock absorption part of the outer case, respectively. Further, FIG. 4 is a bottom view in which the outer case 100 is viewed from below.

Figure 4:
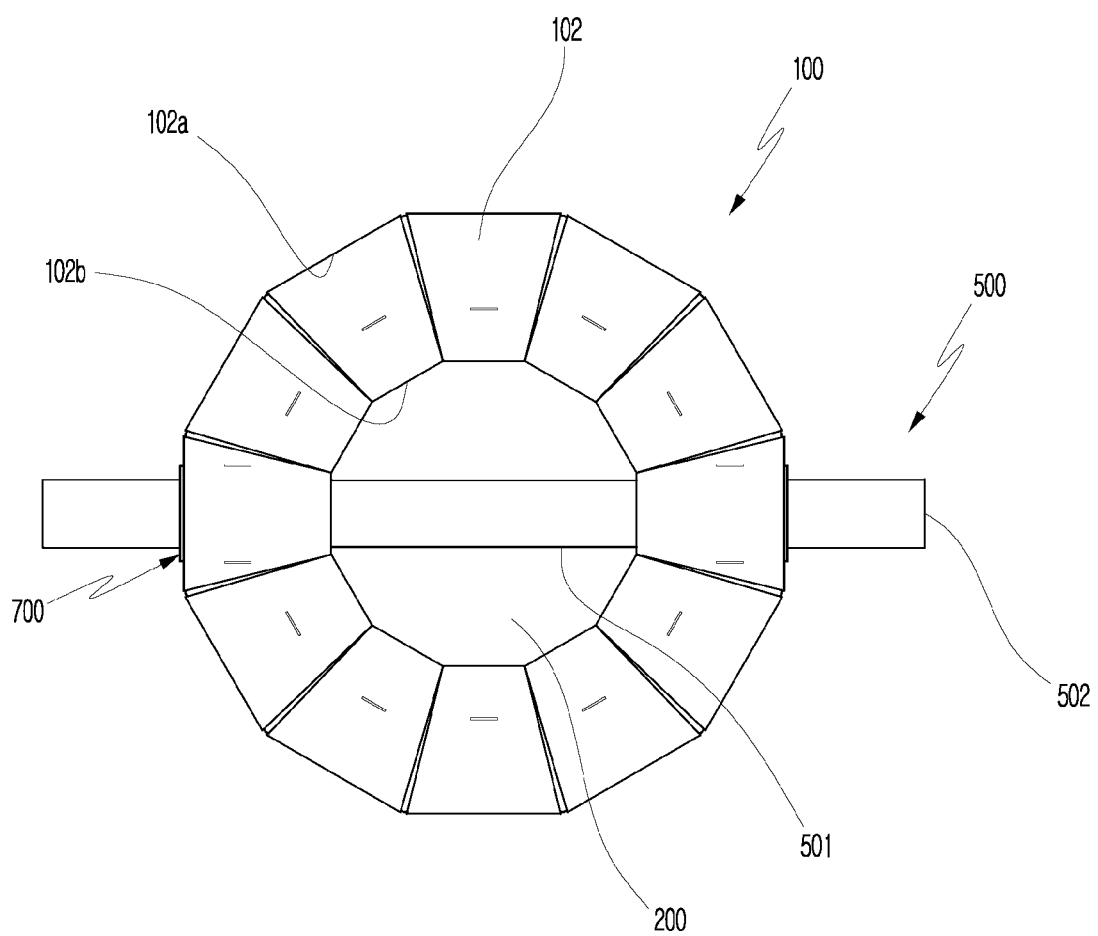
FIG. 4 is a bottom view in which the outer case of the present disclosure is viewed from below.

Referring to FIGS. 2 to 4, the outer case 100 may have a polygonal pillar shape and the outer case 100 may have an outer bottom supporting part 102 formed in a lower portion thereof and a wire accommodation part 103 formed therein and configured to accommodate a wound welding wire (not shown). Further, an inner case which will be described below may be located adjacent to an inner surface 104 and an accommodation space part 130 from which a strap 500 which will be described below is exposed may be formed in an outer surface 105. Further, a strap guide 700 which will be described below may be coupled to the accommodation space part 130.

The outer case 100 may include a strength reinforcement part 110 and a shock absorption part 120 formed at an inner side of the strength reinforcement part 110 to absorb an external impact.

The strength reinforcement part 110 includes a first cardboard 112 and a first corrugated cardboard 111. A cross-sectional shape of the first corrugated cardboard 111 may roughly be a sine-functional wave shape. Due to the shape of the first corrugated cardboard 111, compression load strength and buckling load strength of the strength reinforcement part 110 may be improved. Further, the first cardboard 112 may be formed of an outer first cardboard 112a and an inner first cardboard 112b.

The shock absorption part 120 includes a second cardboard 122 and a second corrugated cardboard 121. A cross-sectional shape of the second corrugated cardboard 121 may roughly be a shape in which pentagons are repeatedly disposed. Due to the shape of the second corrugated cardboard 121, an impact force applied to the shock absorption part 120 is effectively absorbed. Further, the second cardboard 122 may be formed of an outer second cardboard 122a and an inner second cardboard 122b. Meanwhile, according to the embodiment of the present disclosure, the inner first cardboard 112b and the outer second cardboard 122a may be integrally formed.

Further, in the whole outer case 100, since the strength reinforcement part 110 is formed at the outside and the shock absorption part 120 is formed at the inside, when the shock is applied, the outer case 100 is not dented or damaged and the shock is not transferred to the welding wire accommodated in the outer case 100. Accordingly, since a separate storage unit 1000 for welding wire configured to accommodate the welding wire is stacked on the storage unit 1000 for welding wire, the outer case 100 of the lower storage unit 1000 for welding wire does not buckle even when a load is applied.

According to the embodiment of the present disclosure, the outer side of the strength reinforcement part 110 may be coated with a synthetic resin having watertightness. Accordingly, the inside of the strength reinforcement part 110 may be protected from external moisture or the like.

The number of corrugations 111a per unit length of the first corrugated cardboard 111 may be formed to be greater than the number of corrugations 121a of the second corrugated cardboard 121. Accordingly, in the strength reinforcement part 110, a gap between the outer first cardboard 112a and the inner first cardboard 112b is not easily compressed relatively, and the strength reinforcement part 110 may efficiently resist against a compressing force. Meanwhile, in the shock absorption part 120, since a gap between the outer second cardboard 122a and the inner second cardboard 122b is easily compressed relatively, the shock absorption part 120 may efficiently absorb the shock.

According to the embodiment of the present disclosure, in the strength reinforcement part 110, when a length between a corrugation of the first corrugated cardboard 111 and a first corrugation of a next wave adjacent to the corrugation of the first corrugated cardboard 111 is l1 and a thickness of the strength reinforcement part 110 is d1, R1=l1/d1 may be in a range from 2 to 4 and may preferably be in a range from 2.5 to 3.5.

When R1 is smaller than 2, since the length between the corrugations of the first corrugated cardboard 111 becomes excessively smaller than the thickness of the strength reinforcement part 110, productivity of the strength reinforcement part 110 is degraded.

Meanwhile, when R1 is greater than 4, since the length between the corrugations of the first corrugated cardboard 111 becomes excessively greater than the thickness of the strength reinforcement part 110, the strength reinforcement part 110 is easily compressed, dented, or damaged when an external impact is applied, and accordingly, the welding wire stored in the storage unit 1000 may not be protected.

Accordingly, since R1 has a value within the above described numerical range, resistance of the strength reinforcement part 110 against a compressing force is maximized without degradation of production efficiency.

Further, in the shock absorption part 120, when a length between a corrugation of the second corrugated cardboard 121 and a next corrugation adjacent to the corrugation of the second corrugated cardboard 121 is l2 and a thickness of the shock absorption part 120 is d2, R2=l2/d2 may be in a range from 2 to 4 and may preferably be in a range from 2.5 to 3.5.

When R2 is smaller than 2, the length between the corrugation of the second corrugated cardboard 121 and a next corrugation adjacent to the corrugation of the second corrugated cardboard becomes excessively smaller than the thickness of the shock absorption part 120. Accordingly, since resistance of the second corrugated cardboard 121 against a shock increases, the shock is not efficiently absorbed.

Meanwhile, when R2 is greater than 4, the length between the corrugation of the second corrugated cardboard 121 and the next corrugation adjacent to the corrugation of the second corrugated cardboard becomes excessively greater than the thickness of the shock absorption part 120. Accordingly, since the second corrugated cardboard 121 is easily deformed even by a light shock, a shock occurring in a working environment while the welding wire is carried may not be completely absorbed.

Accordingly, since R2 has a value within the above described numerical range, a shock absorption effect of the second corrugated cardboard 121 may be optimized.

According to the embodiment of the present disclosure, when the number of corrugations 111a per unit length of the first corrugated cardboard is C1 and the number of corrugations 121a of the second corrugated cardboard is C2, RC=C1/C2 may be in a range from 1.27 to 1.67 and may preferably be in a range from 1.37 to 1.57.

When RC is smaller than 1.27, since the strength of the strength reinforcement part 110 is degraded, the outer case 100 may be dented or damaged. On the other hand, since the shock absorption part 120 has a resistance against an external impact, the external impact is transferred to the welding wire accommodated in the storage unit 1000 and thus the welding wire may be damaged.

Meanwhile, when RC is greater than 1.67, ease of production may be sharply degraded or the shock absorption performance of the shock absorption part 120 may be degraded.

Accordingly, since RC has a value within the above described numerical range, the strength and shock absorption effect of the outer case 100 may be optimized.

According to the embodiment of the present disclosure, the thickness d2 of the shock absorption part 120 may be greater than the thickness d1 of the strength reinforcement part 110. Accordingly, the strength reinforcement part 110 may serve to provide strength to the outer case 100, and the shock absorption part 120 may easily absorb an external impact applied to the outer case 100.

When the outer case 100 is viewed from below, an outer bottom supporting part 102 may have a trapezoid shape in which a length of an inner side 102b is smaller than that of an outer side 102a and may preferably have an isosceles trapezoid shape. Further, the outer bottom supporting part 102 may be formed in a manner which is integrated with the outer surface 105, extended from the outer surface 105, and folded at a lower edge. In addition, the outer bottom supporting part 102 may also be formed to have a structure of the strength reinforcement part (110, see FIG. 3) and the shock absorption part (120, see FIG. 3).

Figure 5:
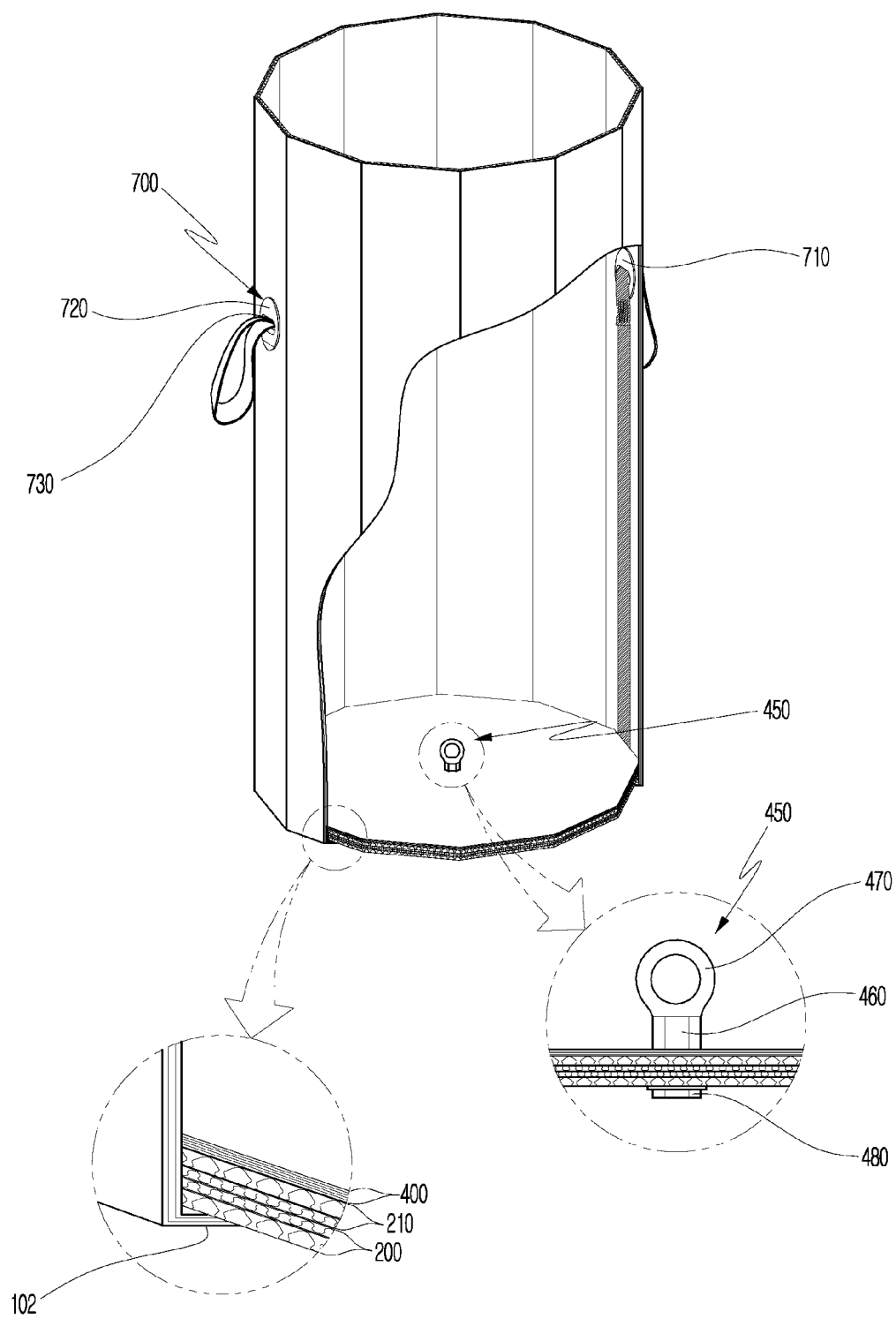
FIG. 5 is a cutaway view of a state in which the outer case according to the embodiment of the present disclosure, a bottom part, a bottom reinforcement part, an elasticity retaining plate, an elastic body retaining part, a strap guide, and a strap are coupled, with partial enlarged views thereof.

FIG. 5 is a cutaway view of a state in which the outer case 100 according to the embodiment of the present disclosure, a bottom part 200, a bottom reinforcement part 210, an elasticity retaining plate 400, an elastic body retaining part 450, the strap guide 700, and the strap 500 are coupled, including partial enlarged views thereof.

Referring to FIG. 5, the bottom part 200 may have a polygonal shape corresponding to a cross-sectional shape of the outer case 100 and may be seated on and coupled to the outer bottom supporting part 102. The bottom part 200 may also be formed to have the structure of the strength reinforcement part (110, see FIG. 3) and the shock absorption part (120, see FIG. 3). Further, the structure of the strength reinforcement part may be formed at an upper side and the structure of the shock absorption part may be formed at a lower side. Accordingly, since dents or damage does not easily occur even when an external force is applied in a vertical direction of the outer case 100 and the external force is easily absorbed, the welding wire accommodated in the storage unit 1000 may be stably protected.

The bottom reinforcement part 210 may be disposed on the bottom part 200. Further, the bottom reinforcement part 210 may also be formed to have the structure of the strength reinforcement part (110, see FIG. 3) and the shock absorption part (120, see FIG. 3).

Meanwhile, the bottom reinforcement part 210 may be formed so that the structure of the shock absorption part is formed at an upper side and the structure of the strength reinforcement part is formed at a lower side. Accordingly, the bottom reinforcement part 210 may easily absorb a shock applied when the welding wire is accommodated.

A hole (not shown) which is capable of coupling the elastic body retaining part 450 which will be described below may be formed in a center portion of each of the bottom part 200 and the bottom reinforcement part 210.

The elasticity retaining plate 400 may be disposed on the bottom reinforcement part 210. Further, the elasticity retaining plate 400 may also be formed to have the structure of the strength reinforcement part (110, see FIG. 3) and the shock absorption part (120, see FIG. 3). Alternatively, the elasticity retaining plate 400 may be formed to have a structure in which multiple layers of scrap paper are stacked to have a compressed structure.

A hole (not shown) may be formed in a center portion of the elasticity retaining plate 400, and the elastic body retaining part 450 may be coupled to the elasticity retaining plate 400 through the hole. More specifically, an upper coupling part 460 of the elastic body retaining part 450 passes through the holes (not shown) formed in the center portions of the elasticity retaining plate 400, the bottom reinforcement part 210, and the bottom part 200 from an upper side of the elasticity retaining plate 400 to be coupled therewith, and a lower coupling part 480 of the elastic body retaining part 450 configured to serve as an engaging port may be engaged with the upper coupling part 460 at a lower side of the bottom part 200.

The upper coupling part 460 of the elastic body retaining part 450 includes a ring-shaped elastic body engaging portion 470 having an upper side with which an elastic body may be engaged.

Figure 6:
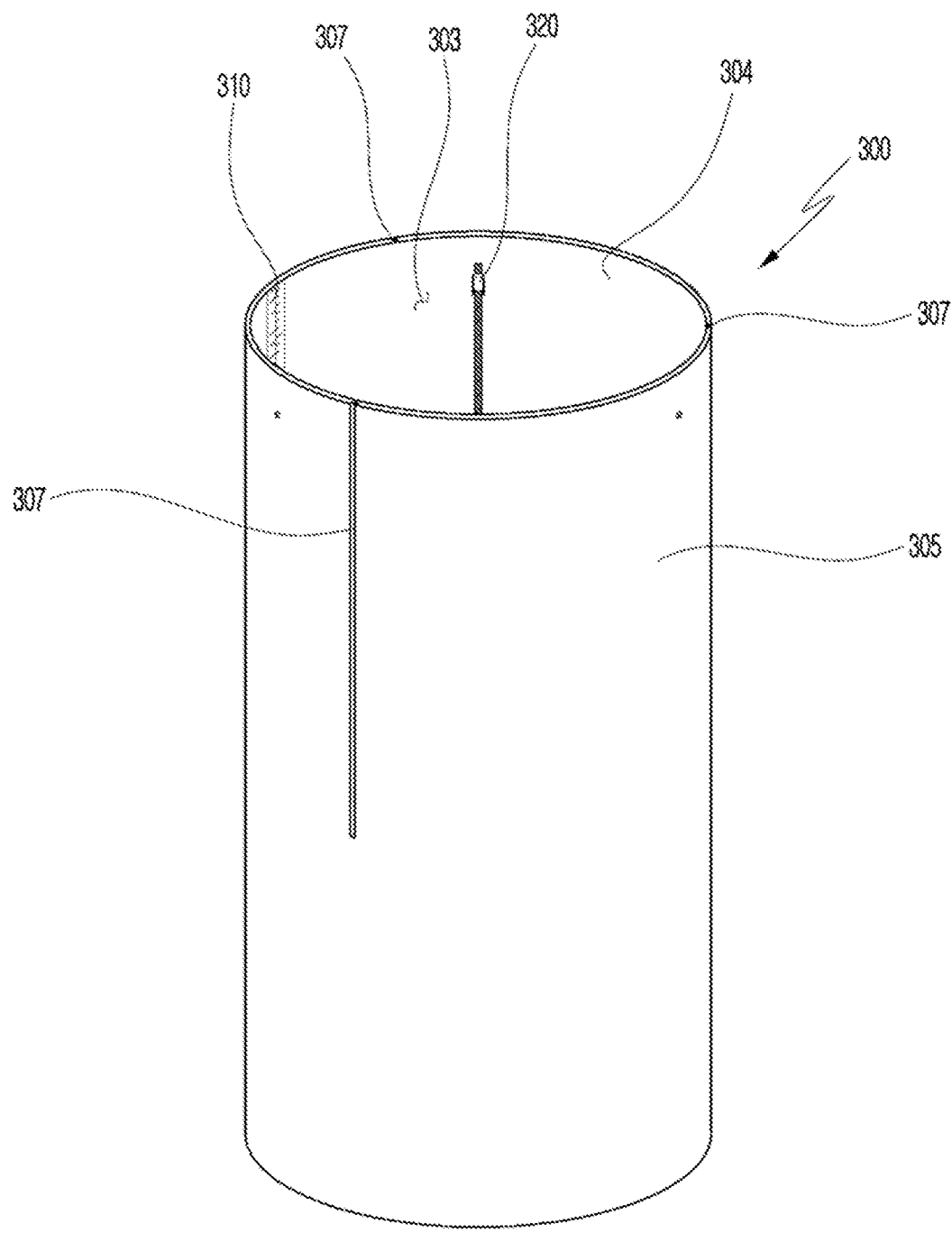
FIG. 6 is a perspective view illustrating an inner case according to the embodiment of the present disclosure.
Figure 7:
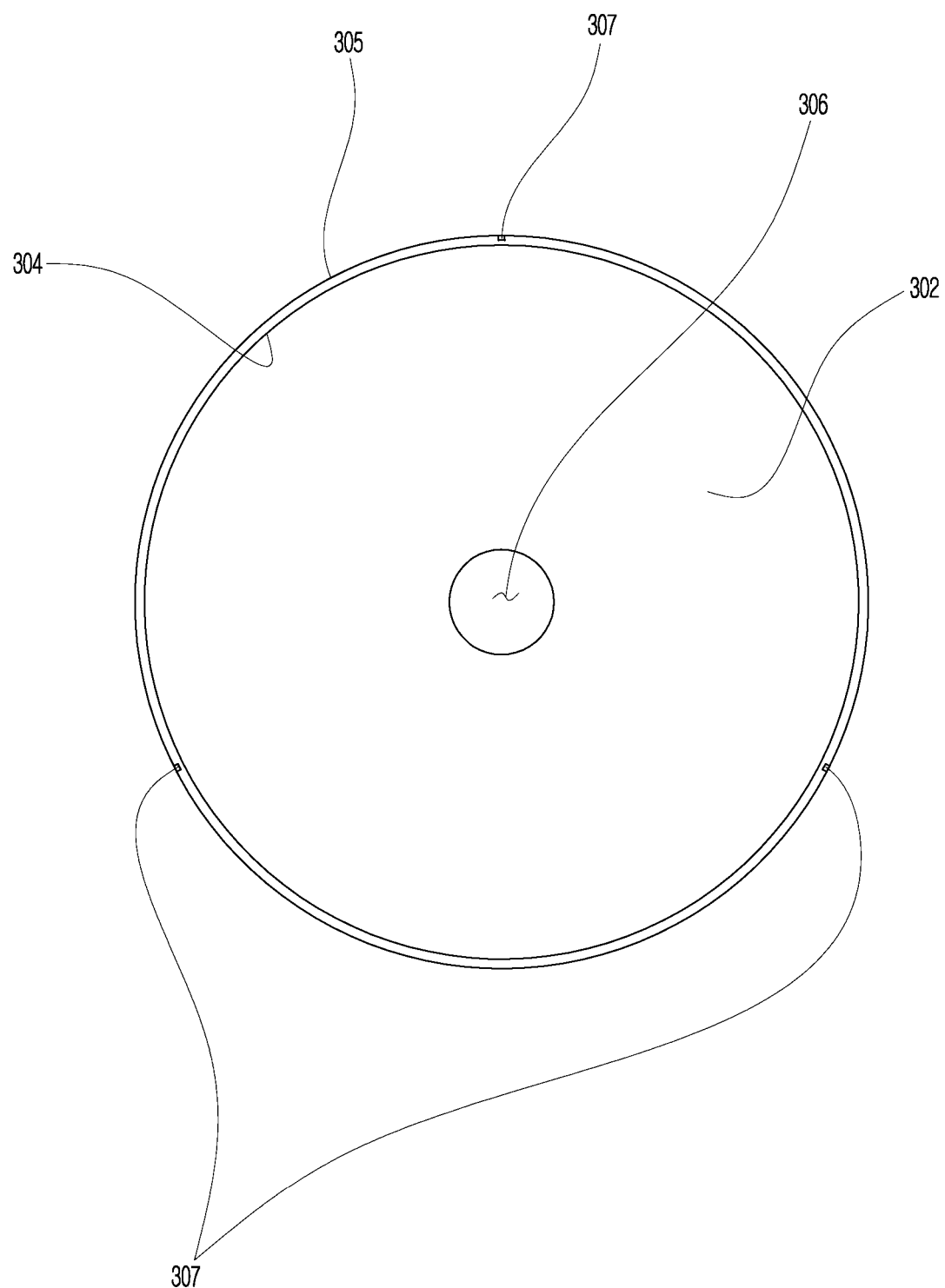
FIG. 7 is a bottom view in which the inner case of the present disclosure is viewed from below.
Figure 8:
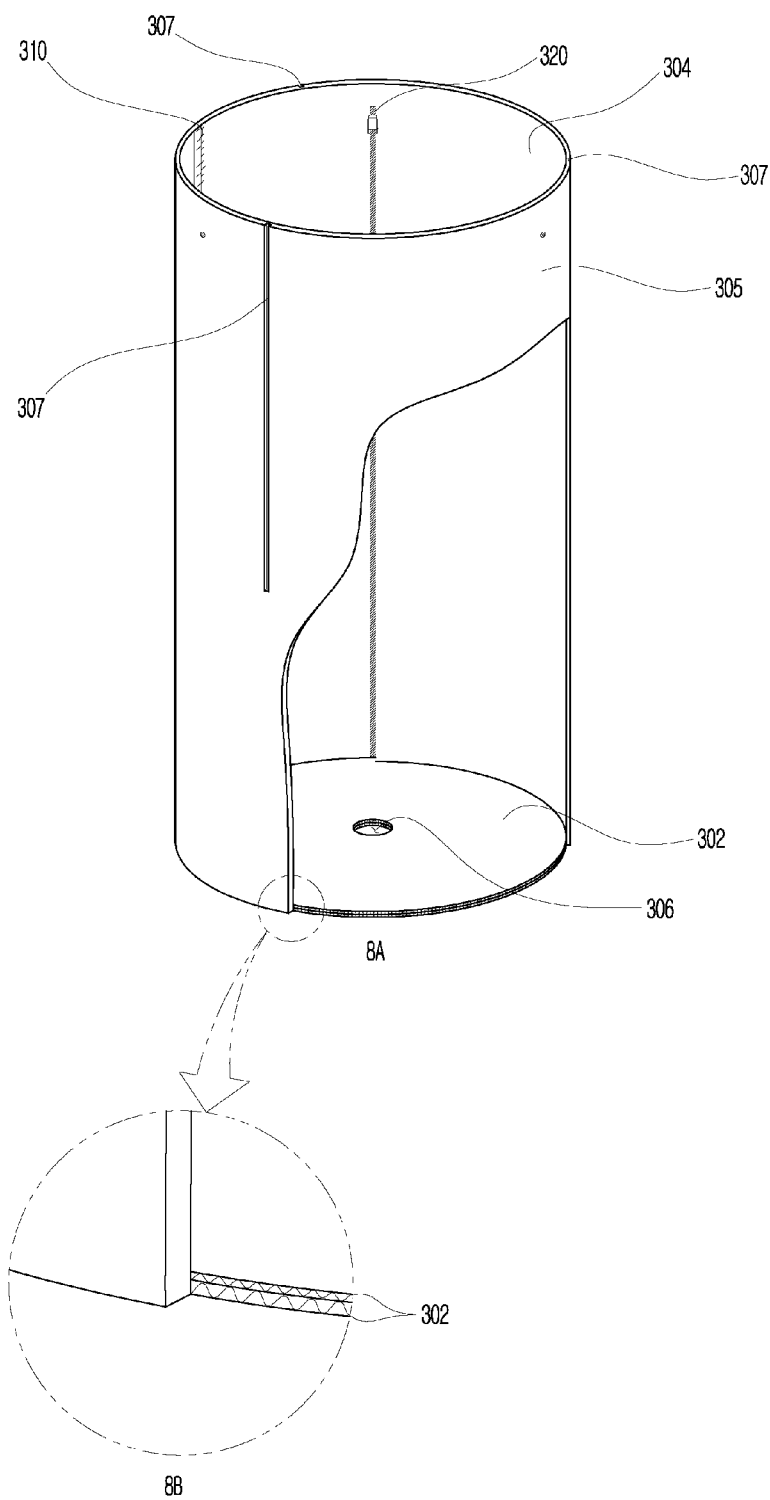
FIG. 8 is a cutaway view of the inner case of the present disclosure with a partial enlarged view thereof.

FIG. 6 is a perspective view illustrating an inner case 300 according to the embodiment of the present disclosure, FIG. 7 is a bottom view in which the inner case 300 of the present disclosure is viewed from below, and FIG. 8 is a cutaway view of the inner case of the present disclosure with a partial enlarged view thereof.

Referring to FIGS. 6 to 8, the inner case 300 may have a cylindrical pillar shape. An inner bottom supporting part 302 may be formed in a lower portion of the inner case 300 and a wire accommodation part 303 capable of accommodating wound welding wires (not shown) may be formed in the inner case 300. Further, the inner case 300 may be detachably inserted into the outer case 100, and when the inner case 300 is inserted into the outer case 100, an outer surface 305 of the inner case 300 comes into close contact with the inner surface 104 of the outer case 100.

The inner case 300 may be formed of paper. Specifically, since the inner case 300 may be made of a hard board formed by pressing multiple layers of cardboard, the cylindrical shape may be solidly maintained.

The inner bottom supporting part 302 may be formed to have the structure of the strength reinforcement part (110, see FIG. 3) and the shock absorption part (120, see FIG. 3). Accordingly, the shock applied when the welding wire is accommodated may be easily absorbed.

A hole 306 may be formed in a center portion of the inner bottom supporting part 302. The elastic body retaining part 450 may be exposed and coupled to a tensile spring through the hole 306.

Further, a residual amount check part 310 capable of checking a residual amount of the wound wires and a retainer guide 320 capable of guiding the movement of a retainer (not shown) may be formed in an inner surface 304 of the inner case 300.

In addition, according to the embodiment of the present disclosure, when the inner case is discarded after all of the wires wound in the storage unit 1000 for welding wire are consumed, at least one cut portion 307 may be formed in an outer surface 305 of the inner case 300 so that the inner case 300 is easily bent.

A shape of the cut portion 307 may be a cut groove having a predetermined depth, a dotted line shape, or another cut shape.

Although the number of cut portions 307 is not limited, the cut portions 307 may preferably be three cut portions formed at 120° angles so that the inner case 300 may maintain solidity and may be easily bent when discarded.

Accordingly, the inner case 300 made of a solid hard board may be easily processed, and the time for discarding may be reduced.

Figure 9A:
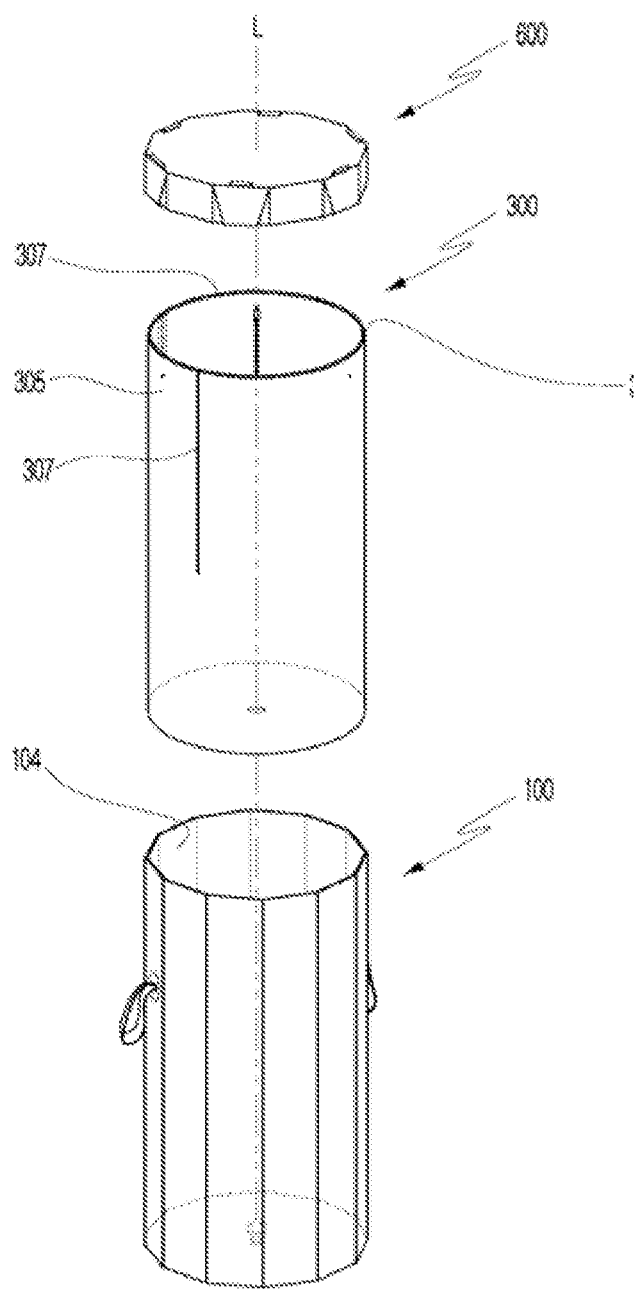
FIGS. 9A and 9B are an exploded view illustrating a case in which the inner case is inserted into the outer case of the present disclosure and a cap covers an upper portion of the outer case on the basis of axis L and a view illustrating a state in which the outer case and the inner case of the present disclosure are coupled, respectively.
Figure 9B:
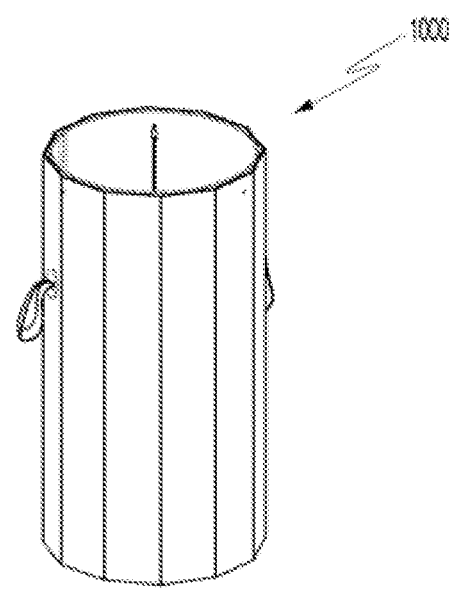

FIGS. 9A and 9B are an exploded view illustrating a case in which the inner case is inserted into the outer case of the present disclosure and the cap covers the upper portion of the outer case on the basis of axis L and a view illustrating a state in which the outer case and the inner case of the present disclosure are coupled, respectively.

Referring to FIGS. 9A and 9B, since the inner case 300 is inserted into the outer case 100 and thus the inner surface 104 of the outer case 100 and the outer surface 305 of the inner case 300 come into contact with each other and the cap 600 is coupled to the upper portion of the outer case 100, the outer case 100 and the inner case 300 may be assembled.

Further, when the inner case 300 is inserted into the outer case 100, the strap 500 may be interposed between the outer surface 305 of the inner case 300 and the inner surface 104 of the outer case 100. Accordingly, the whole strap 500 except a portion exposed to the outer side of the outer case 100 is stably maintained by a friction force between the inner case 300 and the outer case 100.

Referring to FIGS. 3, 6, and 9, since the outer case 100 and the inner case 300 are coupled to each other, a three-layer structure may be formed by the strength reinforcement part 110, the shock absorption part 120, and the inner case 300. Accordingly, the storage unit 1000 for welding wire of the present disclosure may stably protect the welding wire accommodated therein even against an external impact applied in a lateral direction, and may not be bent or damaged even when a buckling load is applied from the above.

Referring to FIGS. 5 and 8, when the outer case 100 and the inner case 300 are coupled to each other, a five-layer structure may be formed by the outer bottom supporting part 102, the bottom part 200, the bottom reinforcement part 210, the elasticity retaining plate 400, and the inner bottom supporting part 302. Accordingly, the storage unit 1000 may stably bear a weight of the welding wire accommodated therein, and the welding wire may be stably protected against a load and shock applied in a vertical direction to the storage unit 1000 for welding wire according to the embodiment of the present disclosure.

Figure 10A:
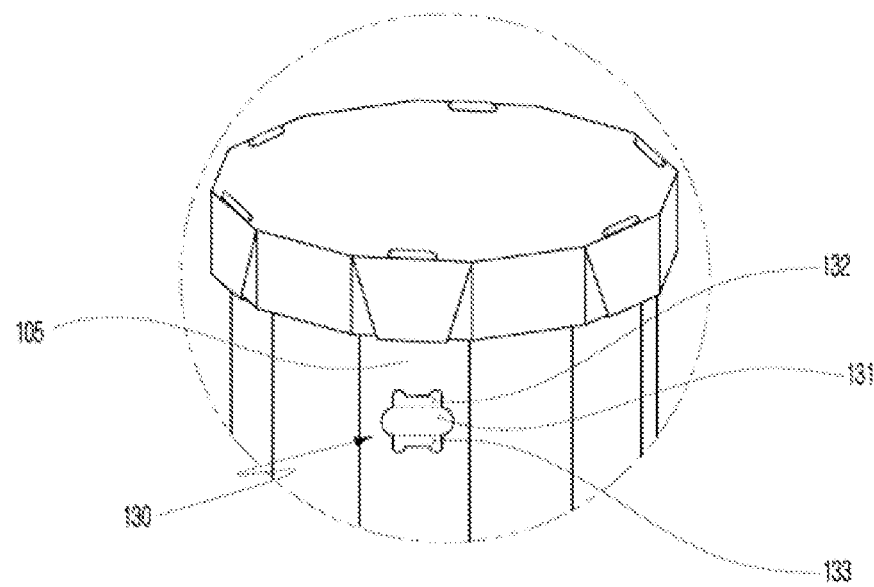
FIGS. 10A and 10B are a front view of an accommodation space part of the storage unit for welding wire according to the embodiment of the present disclosure and a front view of the accommodation space part to which the strap guide is coupled, respectively.
Figure 10B:
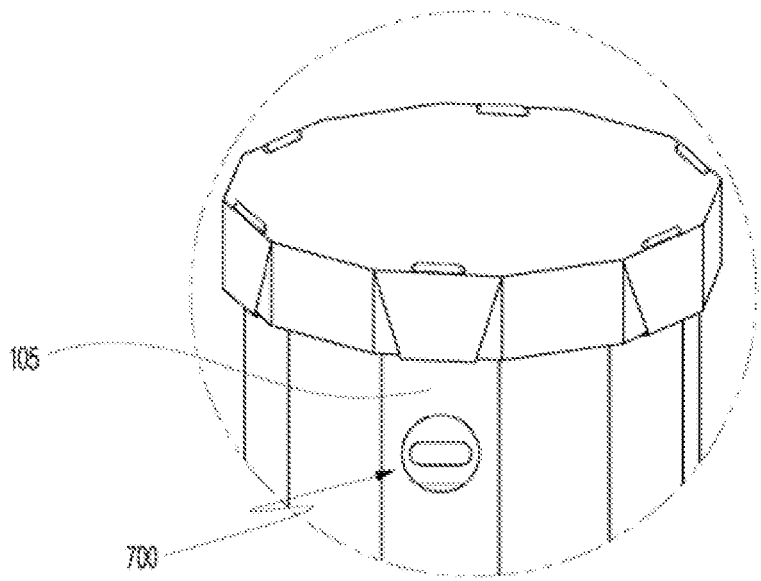
Figure 11A:
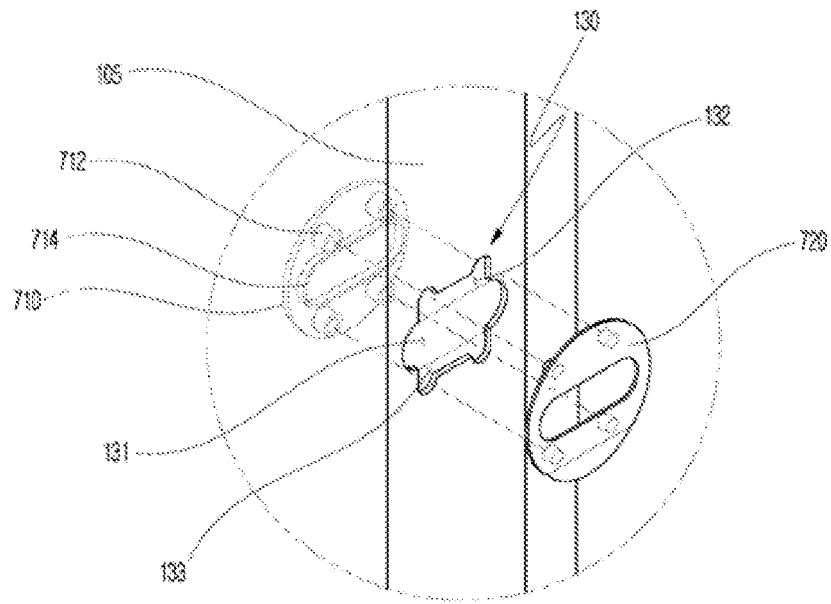
FIGS. 11A and 11B are a perspective view of the accommodation space part of the storage unit for welding wire according to the embodiment of the present disclosure and a perspective view of the accommodation space part to which the strap guide is coupled, respectively.
Figure 11B:
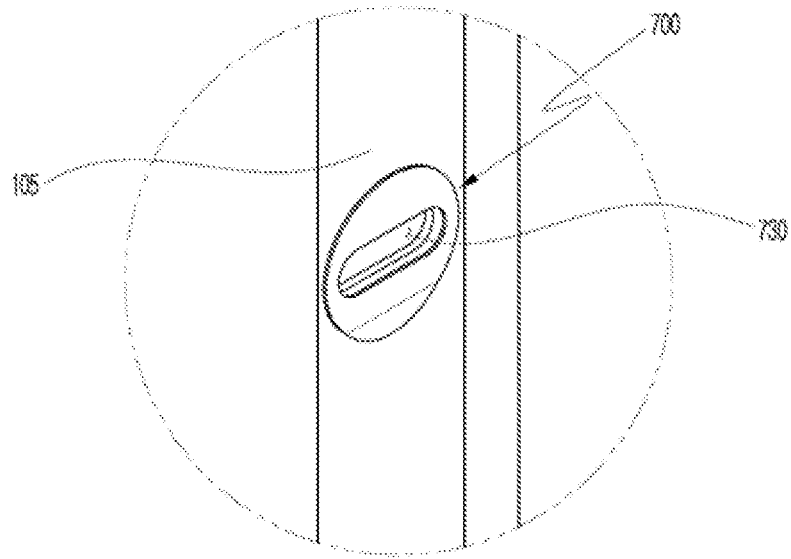
Figure 12A:
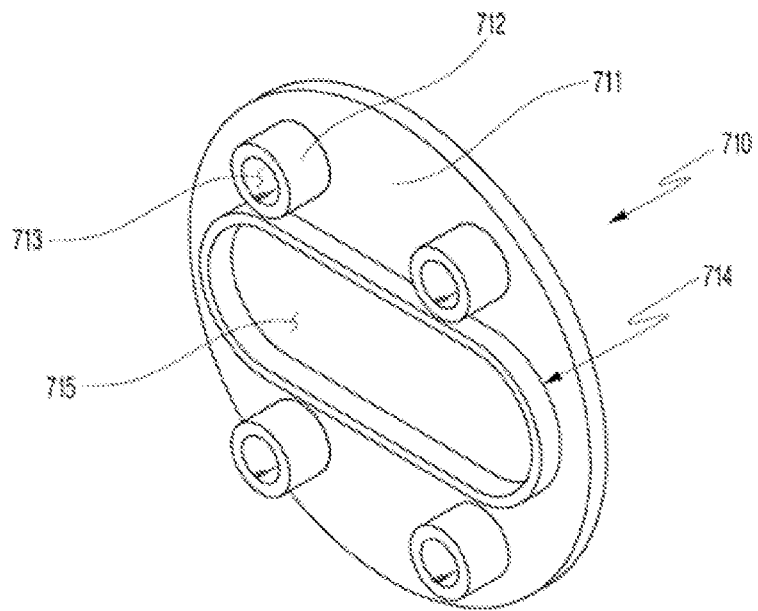
FIGS. 12A and 12B are perspective views of a first module and a second module of the strap guide according to the embodiment, respectively.
Figure 12B:
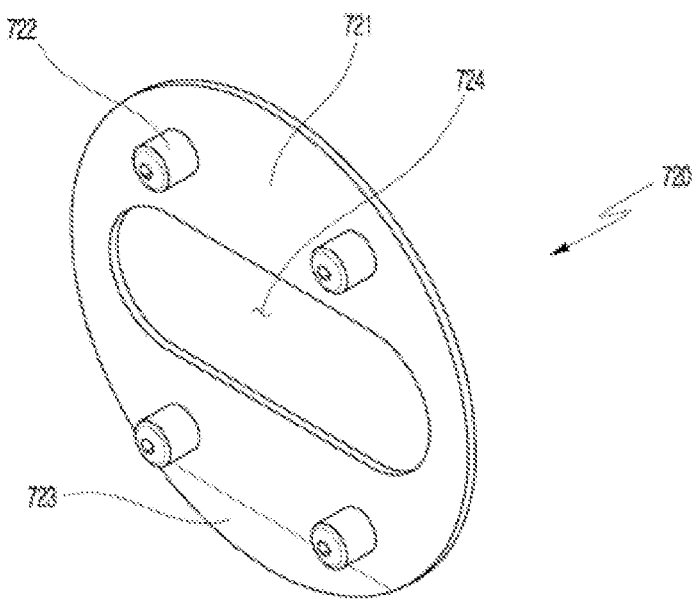

FIGS. 10A and 10B are a front view of the accommodation space part of the storage unit for welding wire according to the embodiment of the present disclosure and a front view of the accommodation space part to which the strap guide is coupled, respectively, FIGS. 11A and 11B are a perspective view of the accommodation space part of the storage unit for welding wire according to the embodiment of the present disclosure and a perspective view of the accommodation space part to which the strap guide is coupled, respectively, and FIGS. 12A and 12B are perspective views of a first module and a second module of the strap guide according to the embodiment, respectively.

Referring to FIGS. 10 to 12, the storage unit 1000 for welding wire may include at least two accommodation space parts 130 configured to accommodate at least two strap guides 700. The strap guides 700 may be coupled to the storage unit 1000 for welding wire through the accommodation space parts 130, and the strap 500 may be exposed to the outer side of the outer case 100 through an opening 730 of the strap guide 700.

The strap guide 700 is used in a manner in which a first module 710 and a second module 720 are coupled or separated through the accommodation space part 130 of the storage unit 1000 for welding wire.

Referring to FIG. 12, the first module 710 includes a first base 711, a strap boss 714, a first slot 715, and at least one protrusion accommodation part 712. The first base 711 may have a thin plate shape having a circular shape, a polygonal shape, or the like.

The strap boss 714 may be formed to have a predetermined height at a center portion of the first base 711, and includes the first slot 715 surrounded by an inner circumferential surface of the strap boss 714.

The protrusion accommodation part 712 may be formed in a height direction of the strap boss 714, and may be located at the outer side of the strap boss 714 to be spaced apart from the strap boss 714 at a predetermined interval. The protrusion accommodation part 712 may include a bore 713 configured to accommodate a coupling protrusion 722 of the second module 720, and may be variously formed according to a shape of the coupling protrusion. Preferably, the protrusion accommodation part 712 may have a cylindrical shape to be easily coupled and separated. The number of protrusion accommodation parts 712 may be one or more. Further, two pairs of protrusion accommodation parts 712 may be formed above and below the strap boss 714 located at the center portion at predetermined intervals.

Continuing to refer to FIG. 12, the second module 720 includes a second base 721, a second slot 724, and at least one coupling protrusion 722. The second base 721 may have a thin plate shape having a circular shape, a polygonal shape, or the like. Preferably, the second base 721 may have a shape corresponding to that of the first base 711.

According to the embodiment, the second base 721 includes a bent portion 723 having an inclination angle and inclined toward the outside, and the second slot 724 located at a base center portion.

The bent portion 723 may serve as a handle configured to allow the coupled strap guide 700 to be easily separated. Further, the bent portion 723 may be formed at one side of the second base 721 without limitation of a particular location in the second base 721. However, preferably, the bent portion 723 may be formed in a lower portion of the second base 721 so that the strap guide 700 may be easily separated from the storage unit 1000 for welding wire. The inclination angle of the bent portion 723 is appropriate when it is an angle which allows fingers to enter between the first module 710 and the second module 720 to separate the coupled strap guide 700 and allows a force to separate the strap guide 700 be smoothly transferred, and the inclination angle of the bent portion 723 may preferably be 10° to 20°.

The coupling protrusion 722 may be located at an outer circumferential portion of the second slot 724 to be spaced apart from the second slot 724 at a predetermined interval, and forms a pair with the protrusion accommodation part 712 of the first module 710 when being coupled. The number of coupling protrusions 722 may be one or more and the number of coupling protrusions 722 may preferably be determined according to the number of protrusion accommodation parts 712.

According to the embodiment, two pairs of coupling protrusions 722 may be formed above and below the second slot 724 located at the center portion at predetermined intervals. A shape of the coupling protrusion 722 may be formed in a shape corresponding to that of the bore 713 of the protrusion accommodation part 712. Preferably, the coupling protrusion 722 may have a cylindrical shape which may be easily coupled and separated, and a corner portion of the cylinder may have a gentle round shape.

Figure 13:
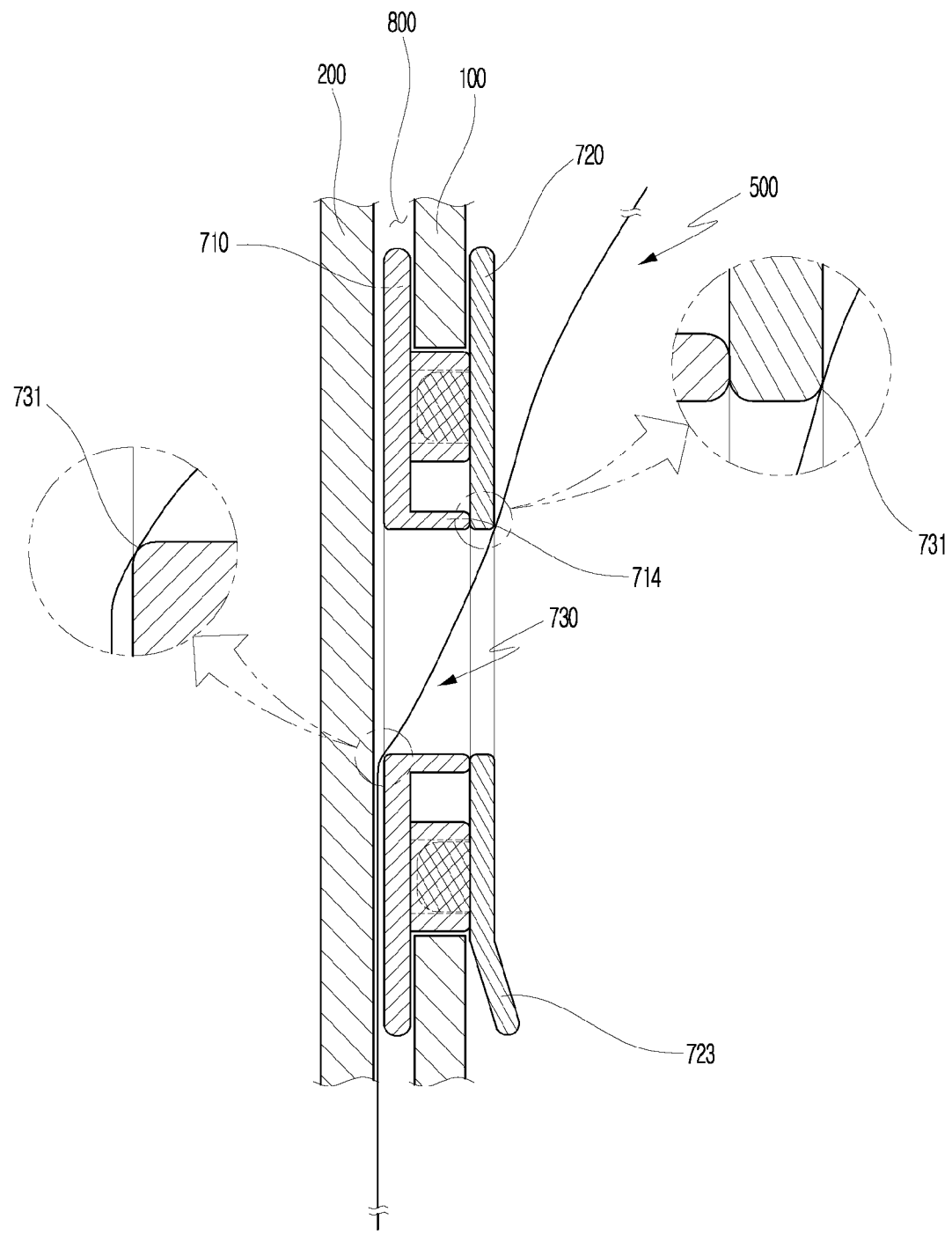
FIG. 13 shows a cutaway view of the storage unit for welding wire to which the strap guide according to the embodiment of the present disclosure is coupled and a partial enlarged view of an edge of an opening.

FIG. 13 shows a cutaway view of the storage unit for welding wire to which the strap guide according to the embodiment of the present disclosure is coupled and a partial enlarged view of an edge of the opening.

Referring to FIGS. 11A, 11B, and 13, since the first module 710 and the second module 720 are coupled to each other, an outer surface of the first base 711, an inner circumferential surface of the strap boss 714, and an outer surface of the second base 721 are connected, and the opening 730 having a single closed surface may be formed.

When a process of moving and storing the storage unit 1000 for welding wire using the strap 500 is repeated over and over, an edge of the accommodation space part 130 of the storage unit 1000 for welding wire may become weak to external actions, and when the opening 730 having the single closed surface is formed, since various external actions may be blocked, durability of the storage unit 1000 for welding wire may be improved. Further, the strap 500 may pass through the opening 730 and may be supported by an edge 731 of the opening 730.

According to the embodiment, the edge 731 of the opening 730 which comes into contact with the strap 500 may have a gentle round shape to improve a supporting force of the strap 500. In this case, since an area in which the strap 500 and the edge 731 of the opening 730 come into contact with each other increases, the strap 500 may be more solidly and safely supported.

Referring to FIGS. 10 and 11, the accommodation space part 130 may include a center space part 131 into which the strap boss 714 is fitted, and an upper space part 132 and a lower space part 133 into which the protrusion accommodation parts 712 are fitted, and the strap guide 700 may be fitted into the accommodation space part 130. The center space part 131 may be formed according to the shape of strap boss 714 and the upper space part 132 and the lower space part 133 may be formed according to shapes of the protrusion accommodation part 712. As described above, when the strap guide 700 is coupled to the accommodation space part 130 in a fitting manner, the strap guide 700 and the storage unit 1000 for welding wire are engaged without shaking and do not rotate in a coupled state, and thus are stable. A shape in which the protrusion accommodation parts 712 are fitted into the upper space part 132 and the lower space part 133 may be changed according to the number of protrusion accommodation parts 712.

Referring to FIGS. 11 and 13, a height of the strap boss 714 may be greater than or equal to a thickness of the outer case 100 to protect the storage unit 1000 for welding wire made of paper. In this case, since the thickness of the outer case 100 does not exceed the height of the strap boss 714 but is less than or equal to the height of the strap boss 714 in a state in which the first module 710 and the second module 720 are securely coupled and thus the outer case 100 may be protected from an external influence, the durability of the storage unit 1000 for welding wire may be improved.

Continuing to refer to FIGS. 11 and 13, the storage unit 1000 for welding wire may be formed in a double-layer structure of the outer case 100 and the inner case 300, and in this case, the storage unit 1000 for welding wire may be a storage unit 1000 for welding wire in which the first module 710 is disposed in an interspace part 800 between the outer case 100 and the inner case 300 of the storage unit 1000 for welding wire and the second module 720 passes through the accommodation space part 130 formed in a side portion of the outer case 100 of the storage unit 1000 for welding wire to be coupled to the first module 710.

Referring to FIGS. 1, 4, 5, and 13, the storage unit 1000 for welding wire according to the embodiment of the present disclosure further includes a strap 500. The strap 500 may be formed of a synthetic resin such as nylon, polyester, or the like. A center portion 501 of the strap 500 may be disposed between the outer bottom supporting part 102 and the bottom part 200. Further, both end portions 502 of the strap 500 may be exposed to the accommodation space part 130 formed to face the outer surface 105 of the outer case 100 or the opening 730 of the strap guide 700 coupled to the accommodation space part 130 to form engaging portions 510.

When the welding wire is stored in the storage unit 1000 for welding wire according to the present disclosure, the center portion 501 of the strap 500 is pressed by the welding wire. Further, arms (not shown) of a lifting device are inserted into both engaging portions 510 and the storage unit 1000 for welding wire is carried in a state of being spaced apart from the ground. In this case, the strap 500 may stably support the welding wire.

Further, the strap 500 may be disposed without being adhered to the outer case 100 so that the engaging portion 510 at the other side may move when the engaging portion 510 at one side is pulled. Accordingly, the strap 500 is conveniently assembled and is easily separated when the storage unit 1000 for welding wire of the present disclosure is discarded.

Further, since the bottom part 200 and the like are disposed on the strap 500 and the welding wire is accommodated on the bottom part 200 and the like to be carried even when the strap 500 and the outer case 100 are coupled without being adhered to each other, the strap 500 does not easily move due to the weight of the welding wire. Accordingly, the welding wire becomes stable to be accommodated and carried.

According to an aspect of the present disclosure, since an outer case includes a strength reinforcement part and a shock absorption part and an inner case is closely coupled to the inside of the outer case, a storage unit for welding wire is not dented or damaged and an inner welding wire can be stably protected even when an external impact is applied.

Further, buckling does not occur even when the storage units for welding wire according to the present disclosure are vertically stacked.

In addition, since the storage unit for welding wire can be made of a paper material, an addition made of other materials such as metal, plastic, or the like to reinforce the storage unit is not necessary, and a strap is easily disassembled, disassembling and recycling the storage unit for welding wire is easy. In addition, transportation costs required to recycle the used storage unit for welding wire and costs necessary to process the storage unit for welding wire as industrial waste can be reduced.

In addition, since the outer side of the strength reinforcement part can be coated with a synthetic resin having watertightness, the inside can be protected from external moisture or the like.

In addition, since a lower portion of the storage unit for welding wire is formed in a five-layer structure by an outer bottom supporting part, a bottom part, a bottom reinforcement part, an elasticity retaining plate, and an inner bottom supporting part, the storage unit for welding wire can stably bear a weight of the welding wire accommodated therein, and can stably protect the welding wire from a load and shock in a vertical direction.

In addition, the storage unit for welding wire having an accommodation space part into which a strap guide can be fitted is stable because the strap guide does not rotate and can be engaged without shaking when the storage unit is lifted or moves.

In addition, since a first module and a second module are coupled to the accommodation space part of the storage unit for welding wire to form an opening of the strap guide having a single closed surface, the storage unit for welding wire can be safely protected from external actions.

In addition, since an edge of the opening of the strap guide is processed to be round, the strap can be solidly and safely supported.

In addition, due to the second module of the strap guide including a bent portion having an inclination angle and inclined toward the outside, the strap guide coupled to the storage unit for welding wire can be easily separated by hand.

In addition, since the inner case includes at least one cut portion in an outer surface thereof, the inner case made of a solid hard board can be easily discarded and the time for discarding can be reduced.

Effects of the present disclosure are not limited to the above-described effects and should be understood to include all effects inferable from the detailed description of the present disclosure or configurations of the present disclosure disclosed in the claims.

The above description of the present disclosure is exemplary, and it may be understood by those skilled in the art that the present disclosure may be easily modified into other specific forms without changing the technical spirit or essential characteristics. Accordingly, the above-described embodiment should be understood to be wholly exemplary and not limited. For example, elements described as a single type may be implemented to be divided, and elements described as being divided may be implemented as a coupled type.

The scope of the present disclosure is shown by the claims which will be described below, and all modifications and modified forms derived from the meanings and the scope of the claims and the equivalents should be included in the scope of the present disclosure.

What is claimed is:

1. A storage unit for a wound welding wire comprising:
    an outer case having an outer bottom supporting part disposed at a lower end thereof and a wire accommodation part configured to accommodate the wound welding wire;
    a bottom part seated on and coupled to the outer bottom supporting part; and
    an inner case configured to come into close contact with an inner surface of the outer case, and having an inner bottom supporting part disposed at a lower portion thereof and configured to be seated on the bottom part,
    wherein the outer case includes a strength reinforcement part and a shock absorption part disposed at an inner side of the strength reinforcement part to absorb a shock from outside,
    wherein the strength reinforcement part includes a first cardboard and a first corrugated cardboard, and the shock absorption part includes a second cardboard and a second corrugated cardboard,
    wherein the number of corrugations of the first corrugated cardboard is greater than the number of corrugations of the second corrugated cardboard, and
    wherein the second corrugated cardboard has a cross-sectional shape in which a plurality of pentagons are repeatedly disposed.

2. The storage unit of claim 1, wherein:
    $R1=l1/d1$ is in a range from 2 to 4 when a length between a first corrugation of the first corrugated cardboard and a second corrugation adjacent to the first corrugation of the first corrugated cardboard is l1 and a thickness of the strength reinforcement part is d1; and
    $R2=l2/d2$ is in a range from 2 to 4 when a length between a first corrugation of the second corrugated cardboard and a second corrugation adjacent to the first corrugation of the second corrugated cardboard is l2 and a thickness of the shock absorption part is d2.

3. The storage unit of claim 1, wherein $RC=C1/C2$ is in a range from 1.27 to 1.67 when the number of corrugations per unit length of the first corrugated cardboard is C1 and the number of corrugations per unit length of the second corrugated cardboard is C2.

4. The storage unit of claim 1, wherein the outer case further includes two or more accommodation space parts each configured to accommodate a strap guide in a side portion.

5. The storage unit of claim 4, wherein the strap guide is configured to be coupled to one of the two or more accommodation space parts, and includes:
    a first module including a first base having a circular shape, a strap boss protruded from the first base and including a first slot surrounded by an inner circumferential surface of the strap boss, and at least one protrusion accommodation part located at an outer circumferential portion of the strap boss and including a bore; and
    a second module having a second base having a circular shape corresponding to that of the first base, a second slot formed in the second base and having a shape corresponding to that of the first slot, and at least one coupling protrusion located at an outer circumferential portion of the second slot and configured to couple with the at least one protrusion accommodation part,
    wherein the first module and the second module are configured to be coupled to form an opening having a single closed surface by a combination of the first slot and the second slot.

6. The storage unit of claim 5, wherein an edge of the opening has a round shape.

7. The storage unit of claim 5, wherein the second base includes a planar portion including the second slot and a bent portion adjacent to an edge of the second base and apart from the second slot, the bent portion being inclined in a direction opposite to a protruding direction of the at least one coupling protrusion from a line defined between the second slot and the edge of the second base to be positioned farthest at the edge of the second base from the planar portion in a direction perpendicular to the planar portion, and the at least one coupling protrusion being located only on the planar portion.

8. The storage unit of claim 5, wherein:
    each of the two or more accommodation space parts includes a center space part into which the strap boss is configured to be fitted, and an upper space part and a lower space part into which the at least one protrusion accommodation part is configured to be fitted; and
    wherein the center space part, the upper space part and the lower space part form a single hole.

9. The storage unit of claim 5, wherein:
    the first module is configured to be disposed in an interspace part between the outer case and the inner case; and
    the second module is configured to pass through one of the accommodation space parts formed in an outer surface of the outer case from an outer side of the outer case to be coupled to the first module.

10. The storage unit of claim 5, wherein a height of the strap boss is greater than or equal to a thickness of the outer case.

11. The storage unit of claim 1, further comprising a strap having a center portion configured to be disposed between the outer bottom supporting part and the bottom part and both end portions configured to be disposed in an interspace part between the outer case and the inner case.

12. The storage unit of claim 1, wherein the inner case further includes at least one cut portion.

* * * * *